(12) United States Patent
Nakamura et al.

(10) Patent No.: US 6,328,476 B2
(45) Date of Patent: *Dec. 11, 2001

(54) ROLLING BEARING UNIT WITH ENCODER

(75) Inventors: Yuji Nakamura; Hiroya Miyazaki; Masahiro Hosoda; Hideo Ouchi, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/750,066

(22) Filed: Dec. 29, 2000

Related U.S. Application Data

(63) Continuation of application No. 09/225,356, filed on Jan. 5, 1999, now Pat. No. 6,186,667.

(30) Foreign Application Priority Data

Jan. 9, 1998 (JP) .................................. H10-2988
Mar. 12, 1998 (JP) ................................ H10-61387

(51) Int. Cl.⁷ .................................................. F16C 19/08
(52) U.S. Cl. ...................................... 384/448; 324/207.25
(58) Field of Search ............................ 384/448; 324/173, 324/174, 207.15

(56) References Cited

U.S. PATENT DOCUMENTS

| | | | |
|---|---|---|---|
| 4,948,277 | * 8/1990 | Alff | 384/448 |
| 5,011,303 | * 4/1991 | Caron | 384/448 |
| 5,090,236 | * 2/1992 | Vignotto | 384/448 X |
| 5,131,763 | 7/1992 | Caron | 384/448 |
| 5,451,869 | 9/1995 | Alff | 324/173 |
| 5,470,157 | 11/1995 | Dougherty et al. | 384/448 |
| 5,476,272 | * 12/1995 | Hixson, II | 384/448 X |
| 5,564,839 | 10/1996 | Ouchi et al. | 384/448 |
| 5,611,545 | * 3/1997 | Nicot | 384/448 X |
| 5,622,437 | 4/1997 | Alff | 384/448 |
| 5,640,087 | * 6/1997 | Alff | 324/173 |
| 5,642,042 | 6/1997 | Goossens et al. | 384/448 X |
| 5,863,124 | * 1/1999 | Ouchi et al. | 384/448 |

FOREIGN PATENT DOCUMENTS

| | | |
|---|---|---|
| 42 06 910 | 7/1993 | (DE) . |
| 691 11 879 | 8/1995 | (DE) . |
| 5-19265 | 5/1993 | (JP) . |

* cited by examiner

Primary Examiner—Thomas R. Hannon
(74) Attorney, Agent, or Firm—Crowell & Moring LLP

(57) ABSTRACT

A rolling bearing unit comprising a rotatable race having an inner peripheral surface formed with an outer ring raceway and an outer peripheral surface formed with a rotating flange, a stationary race having an outer peripheral surface formed with an inner ring raceway, a plurality of rolling members between the outer ring raceway and the inner ring raceway, an annular encoder of multi-pole magnet supported in a concentric relation with the rotatable race to have characteristics alternately changed with a uniform interval in the circumferential direction and having an outer diameter larger than the outer diameter of the rotatable race, and a metal ring for supporting the encoder onto the rotatable race and having a cylindrical portion provided to enclose the encoder.

5 Claims, 13 Drawing Sheets

ROLLING BEARING UNIT WITH ENCODER

This application is a continuation of application Ser. No. 09/225,356, filed Jan. 5, 1999 now U.S. Pat. No. 6,186,667.

FIELD OF THE INVENTION

The present invention relates to a rolling bearing unit with an encoder which is used for rotatably supporting an automobile wheel with respect to the suspension, as well as for detecting the rotation speed of the wheel.

DESCRIPTION OF THE PRIOR ART

Various kinds of rolling bearing units with an encoder have been known in the art which detects the rotation speed of the wheel in order to rotatably support the wheel with respect to the suspension, while in order to be able to control an anti-lock brake system (ABS) or traction control system (TCS). For example, FIG. 1 shows a structure as disclosed in U.S. Pat. No. 5,622,437.

The suspension has a knuckle 1 with a mount hole 2 formed therein, and a stationary race or outer race 3 is fitted into the interior of the mount hole 2. On the inner diameter side of the outer race 3, a pair of inner rings 6a, 6b are provided in a concentric relation with the outer race 3, respectively, to form a rotatable race 5 together with a hub 4. Outer ring raceways 7 in double rows are formed on the inner peripheral surface of the outer race 3 while inner ring raceways 8 are formed on the outer peripheral surface of the inner rings 6a, 6b, and rolling members such as balls 9 or conical rollers are provided between the outer ring raceways 7 and the inner ring raceways 8, so that the rotatable race 5 is rotatably supported inside the outer race 3.

A constant velocity joint 11 has an output shaft 12 which is spline-connected to the central hole 10 of the hub 4 to rotatably drive the rotatable race 5. In addition, onto the outer periphery at one end of the inner ring 6b (right one in FIG. 1, an encoder of permanent magnet 13 is fixed and supported through a slinger 14. This slinger 14 is formed in a generally annular shape with L-shaped cross section and fixedly fitted onto the end of the inner ring 6b.

The permanent magnet 13 is magnetized in the axial directions (left and right directions in FIG. 1). The magnetized directions are alternately changed with a uniform pitch. Accordingly, S-poles and N-poles are circumferentially alternately arranged with a uniform interval on the side surface of the permanent magnet 13.

In addition, a seal ring 15 is fixedly fitted into the inner peripheral surface at one end of the outer race 3, and has seal lips the tip end of which comes in sliding contact with the slinger 14 in the whole circumference.

The mount hole 2, which is a support section of the outer race 3 with reference to the knuckle 1, has a portion which a support plate 16 in a generally annular shape is fixed to and supported by. The support plate 16 has a portion to which a sensor unit 35 is mounted. The sensor unit 35 has elements such as Hall ICs embedded therein to change the output corresponding to the magnetic flux change. With the sensor unit 35 mounted to the portion of the support plate 16, the detection section provided on the tip end of the sensor unit 35 faces the side surface of the permanent magnet 13 with a small clearance therebetween.

When using the rolling bearing unit with the encoder as mentioned above, a vehicle wheel is mounted to the rotatable flange 17 provided on the outer peripheral surface of the hub 4. As the vehicle wheel rotates, the permanent magnet 13 fixedly fitted onto the inner ring 6b rotates, and then the output of the sensor facing the permanent magnet 13 changes. The frequency of the changing output of the sensor is proportional to the rotation speed of the vehicle wheel. Therefore, the output signals of the sensor is sent to a controller, not shown in the figure, it is possible to obtain the rotation speed of the wheel and to adequately control the ABS or TCS.

In the case of the prior art rolling-bearing unit with encoder that is constructed and functions as described above, the shape of the support plate 16, that separates the permanent magnet 13 of the encoder from the outside, is complex. Therefore, the manufacturing cost of a rolling-bearing unit with encoder that includes this support plate 16 becomes expensive. Also, since this support plate 16 does not rotate even when the wheel rotates, there is little seal effect by this support plate 16. This is because there is unavoidably a large gap around the tip end of the sensor unit 35 supported by the support plate 16.

Regardless of the existence of this support plate 16, it is easy for rain water and the like that is brought in by the wheel to get into the area where the permanent magnet 13 is located. As a result, there is a possibility that foreign matter, such as magnetic dust, could adhere to the permanent magnet 13 and lower the accuracy of the rotation speed detection device.

For a rolling-bearing unit that supports the wheel so that it can rotate freely with respect to the suspension device, it is possible to construct it such that the rotating race is provided on the outer race side, other than that the rotating race is provided on the inner race side as in the case of the prior art construction shown in FIG. 1. However, for the prior art construction shown in FIG. 1, if the outer race is used as the rotating race, it is difficult to obtain adequate seal performance.

For example, a rolling-bearing unit having the rotation speed detector which is constructed as shown in FIG. 1 installed therein and using the outer race as the rotating race, has been disclosed in U.S. Pat. No. 5,451,869. However, in the construction disclosed in U.S. Pat. No. 5,451,869, since the outer race is the only member that rotates and is located further outside in the radial direction than the encoder, it is difficult to effectively prevent matter from adhering to the encoder.

SUMMARY OF THE INVENTION

An object of the present invention, taking the problems as mentioned above into consideration, to provide a rolling bearing unit with encoder in low-cost construction wherein the outer race is the rotating race, and making it possible to effectively prevent foreign matter from penetrating into the encoder section.

DETAILED DESCRIPTION OF THE PREFERRED EMBODIMENTS

Figure 1:
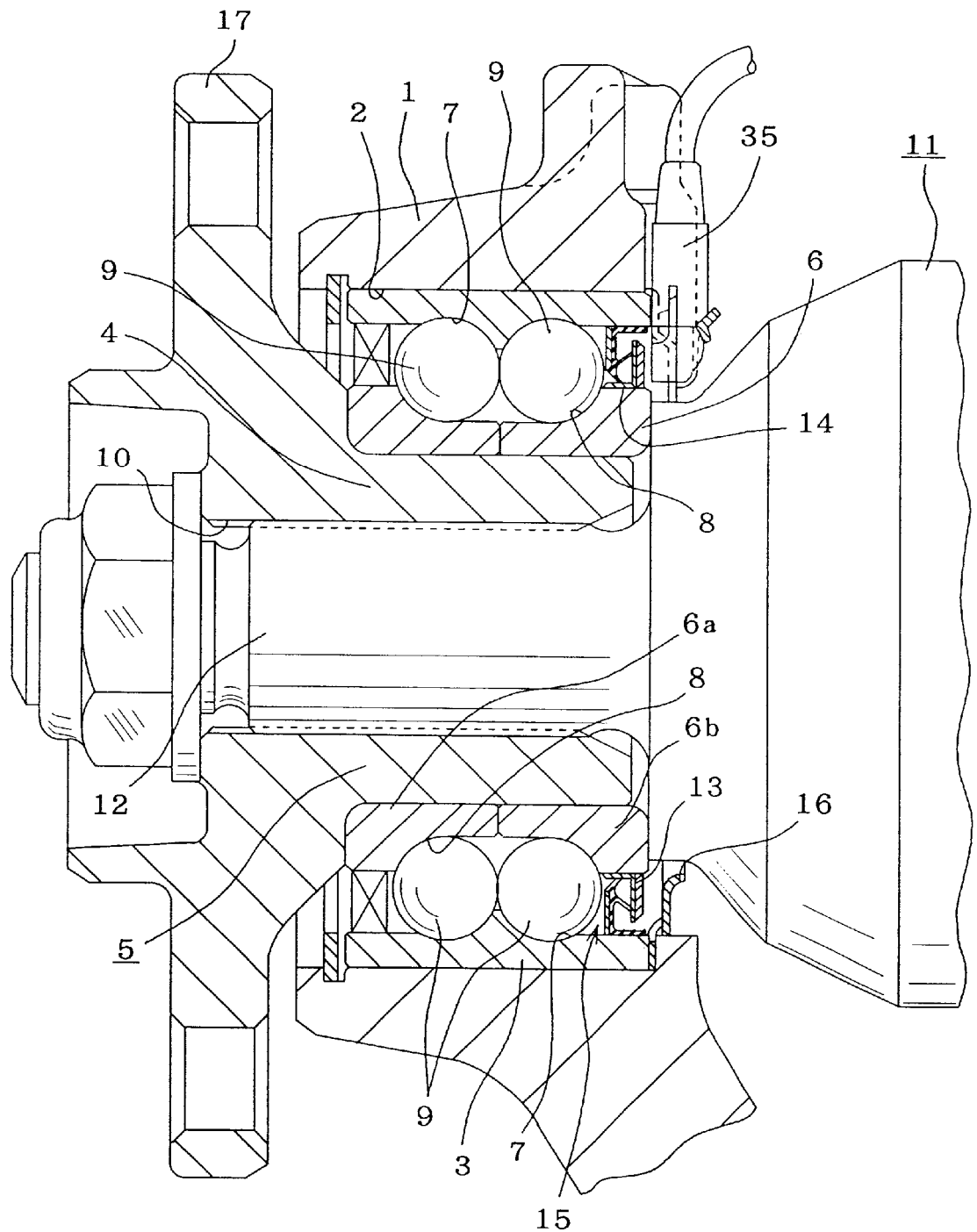
FIG. 1 is a cross sectional view of an example of the prior art rolling bearing unit with encoder.

The rolling-bearing unit with encoder according to one embodiment of this invention comprises a rotating race which has a double row of outer-ring raceways around its inner peripheral surface and a rotating flange for supporting and attaching a vehicle wheel around its outer peripheral surface, respectively, a stationary race which has a double row of inner-ring raceways around its outer peripheral surface and a connection section for connecting to a suspension device of the vehicle, a plurality of rolling members that are located between the outer-ring raceways and inner-ring raceways so that they are able to rotate freely, a seal ring which has a metal ring and elastic seal lips, of which the metal ring fits around and is supported by one end of the rotating race, and a circular shaped encoder which is concentric with the rotating race and is supported by a part of the seal ring such that its magnetic characteristics alternately change at a uniform interval in the circumferential direction.

Also, at least one of the edges of the seal lips comes in sliding contact with part of the outer peripheral surface of the stationary race. Moreover, in the part of the metal ring that is further outward in the radial direction than the encoder, there is a cylindrical section that is bent toward the connection section.

The rolling-bearing unit with encoder of this embodiment, constructed as described above, rotatably supports the wheel with respect to the suspension device, and detects the rotation speed of the wheel in the same way as that of the prior art rolling-bearing unit with encoder.

Particularly, in the case of the rolling-bearing unit with encoder of this embodiment, the cylindrical section of the metal ring of the seal ring encloses the encoder, so that it is possible to prevent foreign matter from adhering to the encoder and thus it is also possible to prevent the drop in accuracy of rotation speed detection due to the adhering matter.

The rolling-bearing unit with encoder according to another embodiment of this invention comprises a rotating race which has a double row of outer-ring raceways around its inner peripheral surface and a rotating flange for supporting and attaching a vehicle wheel around its outer peripheral surface, respectively, a stationary race which has a double row of inner-ring raceways around its outer peripheral surface, a plurality of rolling members that are rotatably located between the outer-ring raceways and inner-ring raceways, an encoder which is concentric with the rotating race and is supported by the rotating race through a metal ring such that its magnetic characteristics alternately change at a uniform interval in the circumferential direction.

In addition, as required, a seal ring is provided which has a metal ring and elastic seal lips, of which the metal ring fits around and is supported by one end of the rotating race.

Moreover, in the part of the metal ring that is further outward in the radial direction than the encoder, there is a circular, conical or polygonal cylindrical section, that is bent toward the direction opposite to the rolling members.

Particularly, in the case of the rolling-bearing unit with encoder of this embodiment, the cylindrical section of the metal ring to support the encoder onto the rotating race encloses the encoder, so that it is possible to prevent foreign matter from adhering to the encoder and thus it is also possible to prevent the drop in accuracy of rotation speed detection due to the adhering matter.

Now, some embodiments of the present invention are explained referring to the attached drawings, wherein like numerals are used to indicate like members.

Figure 2:
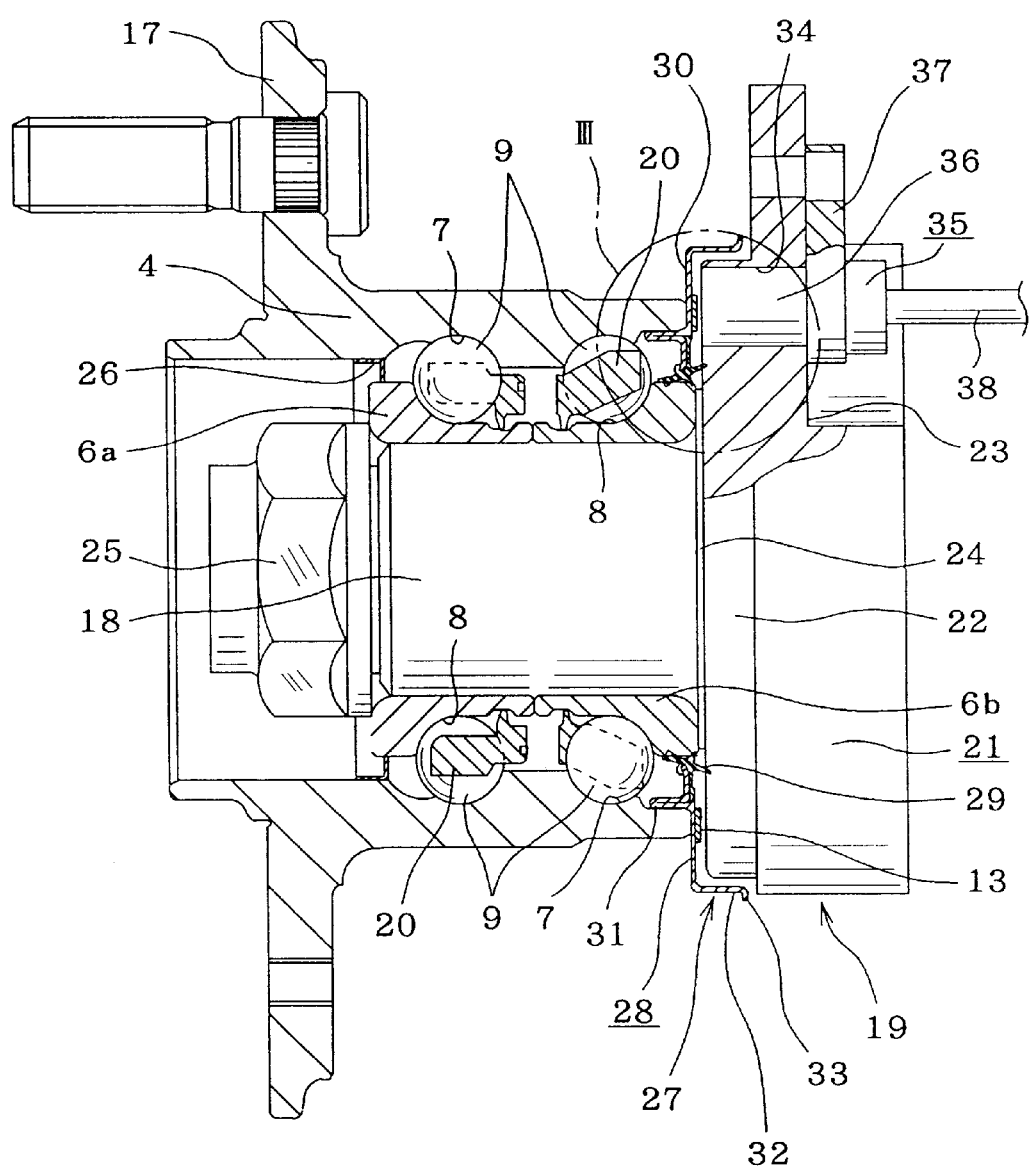
FIG. 2 is a cross sectional view of the rolling bearing unit with encoder according to an embodiment of the present invention.
Figure 3:
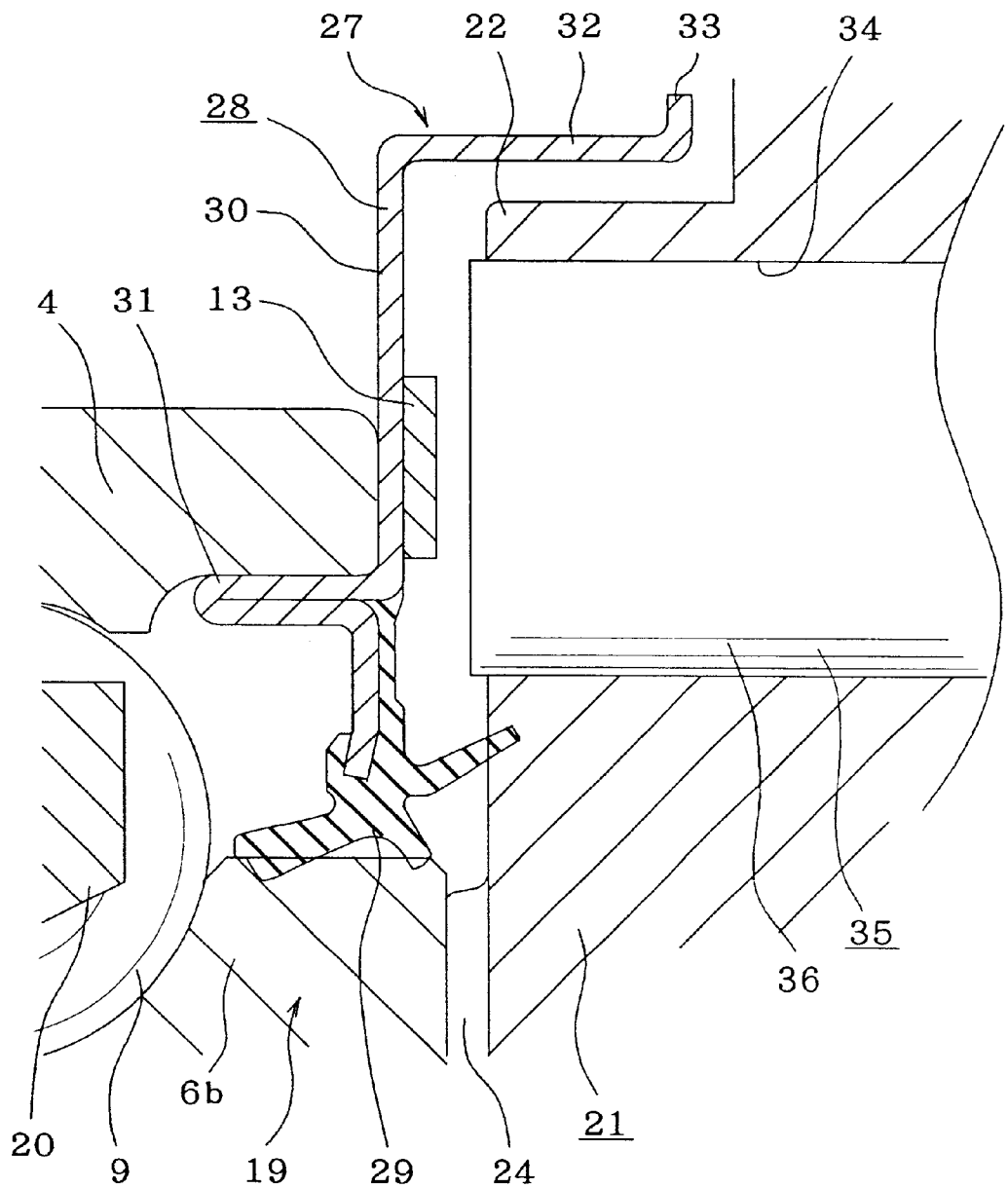
FIG. 3 is an enlarged view of Portion III in FIG. 2.

FIGS. 2 and 3 show an embodiment of this invention. A hub 4 is provided to function as the outer race of the rolling bearing unit and as the rotating race that rotates together with the wheel during operation, and double rows of outer-ring raceways 7 are formed around the inner peripheral surface of the hub 4.

A pair of inner races 6a, 6b are provided to form the stationary race 19 together with a spindle 18, and double rows of inner-ring raceways 8 are formed around the outer peripheral surfaces of the inner races 6a, 6b.

There are also balls 9 rotatably held between the outer-ring raceways 7 and inner-ring raceways 8 by cages 20, respectively. In the case of a rolling-bearing unit for a heavy vehicle, other rolling members, such as conical rollings, may be used instead of the aforementioned balls 9.

Moreover, a connection section 21 is formed at the base end (right end in FIG. 2) of the spindle 18 to support the stationary race 19 with the suspension device (not shown) of the vehicle. Of the both side surfaces in the axial direction (left and right direction in FIG. 2) of this connection section 21, the side surface on the side of spindle 18 is formed with a circular raised section 22 that is concentric with the spindle 18. On the other hand, an inset section 23 is formed on part of the side surface on the opposite side from the spindle 18, closer to the outer peripheral edge of the connection section 21. Furthermore, in the center of this circular raised section 22, a step section 24 for abutment is formed around the base end of the spindle 18.

A nut 25 is screwed on to the tip end (left end in FIG. 2) of the spindle 18, while there is a rotating flange 17 provided on the outer peripheral surface of the hub 4.

The pair of inner-races 6a, 6b are supported on both ends in the axial direction between this abutment step section 24 and the nut 25 and fixed in place around the spindle 18. When the rolling-bearing unit is installed in the vehicle, the connection section 21 is attached to the suspension device by bolts or studs (not shown in the figures), and the wheel (not shown in the figures) is attached to the rotating flange 17 that is formed around the outer peripheral surface of the hub 4.

The opening on the axially outer end of the hub 4 (the end that faces the outside when the rolling-bearing unit is installed in the vehicle is called the axially outer end, and is the left end in FIG. 2) is covered by a cover (not shown in the figures) to prevent rain water or the like from getting inside the hub 4.

Also, there is a shield plate 26 that fits inside around the inner peripheral surface in the center portion of the hub 4, and this shield plate 26 is adjacent to and faces the outer peripheral surface of the axially outer end of the inner race 6a on the axially outer side (left side in FIG. 2), making it possible to prevent the grease, that is filled in the area where the balls 9 are located, from leaking out.

On the other hand, a seal ring 27 is fitted inside the opening on the side of the axially inner end of the hub 4 (the end that faces the inside when the rolling-bearing unit is installed in the vehicle is called the axially inside end, and is the right end in FIG. 2). This seal ring 27 has a metal ring 28 and seal lips 29. Of these, the metal ring 28 is made by bending of anti-corrosive magnetic metal such as stainless steel plate, galvanized steel plate, or chrome plated steel plate, and is formed into a circular ring shape. In other words, the metal ring 28 comprises a circular section 30 the center portion in the diametrical direction of which is bent to protrude axially outward (left in FIGS. 2 and 3), and this protruding section is bent back 180 degrees in the center thereof, to form a cylindrical fitting section 31 that has the thickness of two layers of magnetic metal sheet.

Furthermore, the outer peripheral edge of the circular ring section 30 is bent at a right angle toward the connection section 21 to form a cylindrical section 32. Also, the inner peripheral surface of the tip half portion (right half in FIGS. 2 and 3) of this cylindrical section 32 faces and comes very close to the outer peripheral surface of the circular raised section 22 that is formed on the axially outer side surface of the connection section 21, and the tip end edge of the tip half portion comes very close to the axially outer side surface (left side surface in FIGS. 2 and 3) of this connection section 21. Incidentally, in this embodiment shown in the figures, the tip end edge of the cylindrical section 32 is bent at a right angle outward in the radial direction to form an outward flange-shaped brim portion 33.

This kind of metal ring 28 is fastened to the hub 4 with the cylindrical fitting section 31 fitted into the inner end of the hub 4 by interference fitting.

The metal ring 28 of the seal ring 27 has a permanent magnet 13 that functions as the encoder and is located all the way circumferentially around in the center of the inner side surface of the circular section 30. This permanent magnet 13 is made of a permanent magnet material such as rubber magnet, plastic magnet, ferrite magnet, or the like, and its direction of magnetic orientation is in the axial direction (left and right in FIGS. 2 and 3). The direction of magnetic orientation alternately changes at equal intervals all the way around in the circumferential direction.

Accordingly, on the axially inner side surface of the permanent magnet 13 (right side surface in FIGS. 2 and 3), the S poles and N poles are arranged alternately in the circumferential direction at equal intervals. This kind of permanent magnet 13 is attached to the outer-diameter half portion on the axially inner side surface of the metal ring 28 by its own magnetic attractive force or by the use of an adhesive or glazing. Also, the permanent magnet 13 rotates together with the hub 4 and with the seal ring 27 including the metal ring 28.

Moreover, the seal lips 29 are made of an elastic material like an elastomer such as nitryl rubber or vinyl, and attached all the way around the inner edge of the circular section 30 by glazing or adhesive. Of the end edges of these seal lips 29, two end edges that stick out toward the radially inside, come in sliding contact all the way around the outer peripheral surface of the axially inner end of the inner race 6b on the axially inner side (right side in FIG. 2) of the pair of inner races 6a, 6b. And, one end edge that protrudes axially inward (right direction in the left right direction in FIGS. 2 and 3) comes in sliding contact all the way around the axially outer side surface of the connection section 21.

Incidentally, instead of the structure that the protruding section of the circular section 30 is bent back 180 degrees in the center thereof to form a cylindrical fitting section 31 in the radially middle portion of the circular ring section 30, this center of the protruding section can be bent at an angle of 90 to 140 degrees to extend radially inward, so that the seal lips 29 are attached generally circumferentially to the inner periphery of the bent portion. However, in this structure, the bent portion of the metal ring 28 is inclined to interfere with the balls 9 on the inner rings 6b unless the axially inner end of the hub 4 is made longer, or the fitting length of the cylindrical section 31 is made shorter. It will be noted that the present embodiment is not subject to such inconvenience.

Furthermore, on the outer peripheral portion of the connection section 21, there is an installation hole 34 for a sensor unit 35 provided at a location in alignment with the inset section 23 and part of the axially inner side surface of the permanent magnet 13. Also, the sensor unit 35 has an insert portion 36, which is inserted inside this installation hole 34, and this sensor unit 35 has an installation flange 37 which formed around the base end thereof attached to the connection section 21 with installation screws (not shown in the figures). In this state, the detection section formed on the tip end of the insert section 36 comes very near to and faces the axially inner side surface of the part of the permanent magnet 13 through a small gap therebetween.

There is a harness 38 one end of which is connected to the sensor unit 35.

With the rolling-bearing unit of this invention constricted as described above with an encoder having a sensor installation section, the function of supporting the wheel, that is attached to the rotating flange 17 formed around the outer peripheral surface of the hub 4, so that it is able to rotate freely with respect to the suspension device, and the function of detecting the rotation speed of the wheel is substantially the same as that of prior art rolling-bearing units with encoder.

In other words, the output signal of the sensor, that is built into the sensor unit 35 and which faces the part of the permanent magnet 13 that rotates together with the hub 4, changes at a frequency that is proportional to the rotation speed of the wheel. If this output signal is then sent to a controlling device by way of the harness 38, it is possible to adequately control an ABS or TCS.

Particularly, in the case of the rolling-bearing unit with encoder of this embodiment, foreign matter, such as magnetic dust, is prevented from adhering to the permanent magnet 13 which functions as the encoder, and thus it is possible to prevent loss of accuracy of detecting the rotation speed due to foreign matter adhering to the encoder.

In other words, since the outer-diameter half portion of the circular section 30 and the cylindrical section 32 of the metal ring 28 in the seal ring 27 cover the area around the permanent magnet 13, rain water or the like is not directly splashed on to the permanent magnet 13 while the vehicle is operating.

Also, since the inner peripheral surface on the tip half portion of the cylindrical section 32 comes close to and faces the outer peripheral surface of the circular raised section 22 formed on the axially outer side surface of the connection section 21, and the tip end edge comes close to and faces the axially outer side surface of the connection section 21 to form a labyrinth seal on the respective portions, it is difficult for rain water or the like to get inside to where the permanent magnet 13 is.

Moreover, when the vehicle is operating, the metal ring 28 rotates together with the hub 4 that is attached to the wheel, so the foreign matter, such as rain water, that adheres to the metal ring 28 is flipped outward in the radial direction by the centrifugal force. Therefore, it is possible to even more certainly prevent foreign matter from adhering to the permanent magnet 13, and thus the function of preventing loss of accuracy of detecting the rotation speed becomes excellent.

Incidentally, the metal ring 28 of the seal ring 27 is made of a magnetic member, and not of a magnet member, and can exhibit weak magnetism. Then, with the weak magnetism of the cylindrical portion 32 of the metal ring 28, foreign matter such as magnetic dust can be adsorbed by the cylindrical portion 32 by way of the magnetic force during automobile operation. Accordingly, the foreign matter is more securely prevented from entering the interior of the rolling bearing unit through the labyrinth seal defined by the cylindrical section 32 and part of the connection section 21, and thereby the precision in detection of rotation speed is prevented from being worsened due to the foreign matter such as magnetic dust attached to the permanent magnet 13. In addition, it is possible to mount a permanent magnet to the outer peripheral surface of the cylindrical section 32 for securely adsorbing harmful foreign matter, which may increase the cost more or less.

Figure 4:
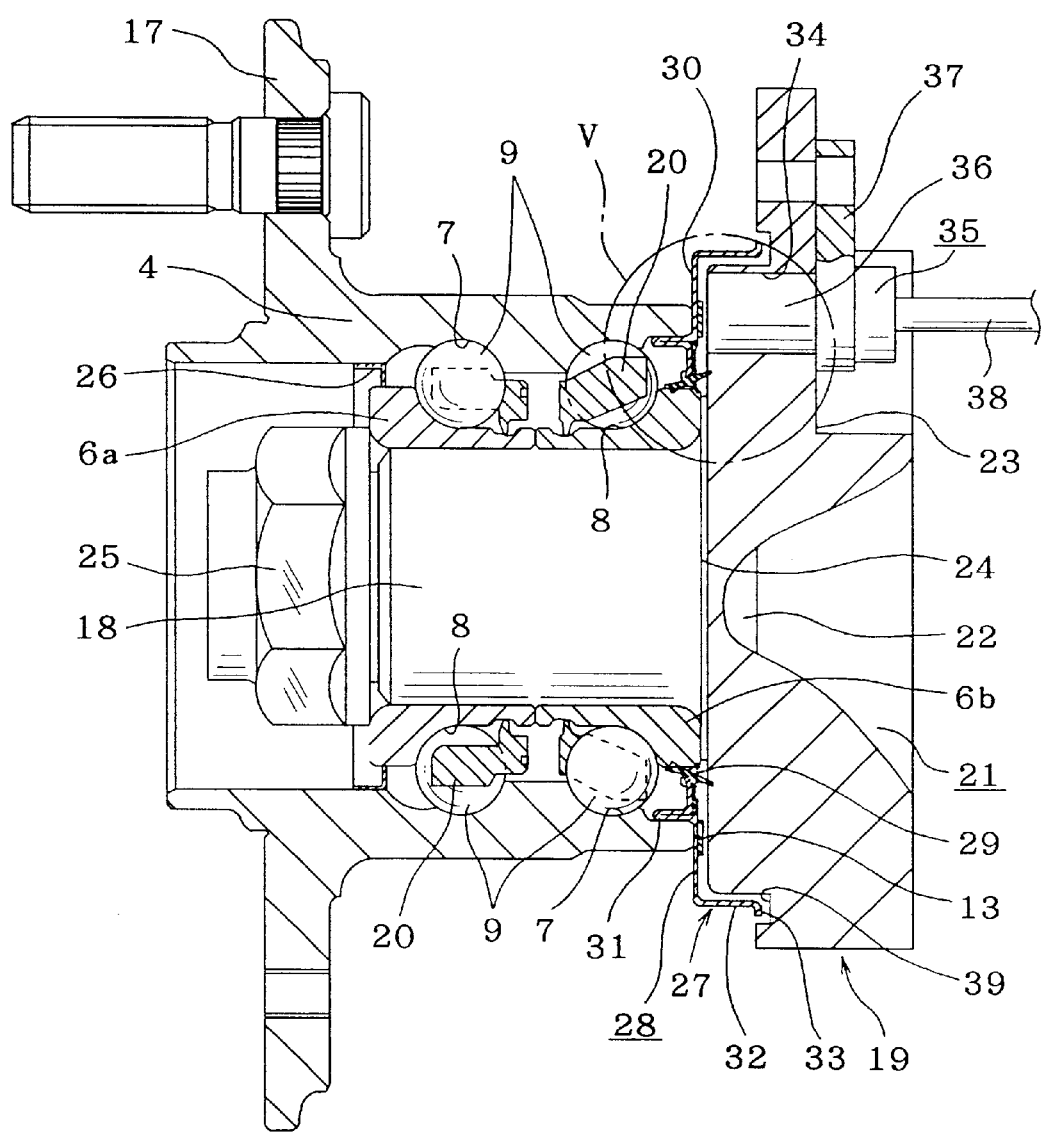
FIG. 4 is a cross sectional view of the rolling bearing unit with encoder according to another embodiment of the present invention.
Figure 5:
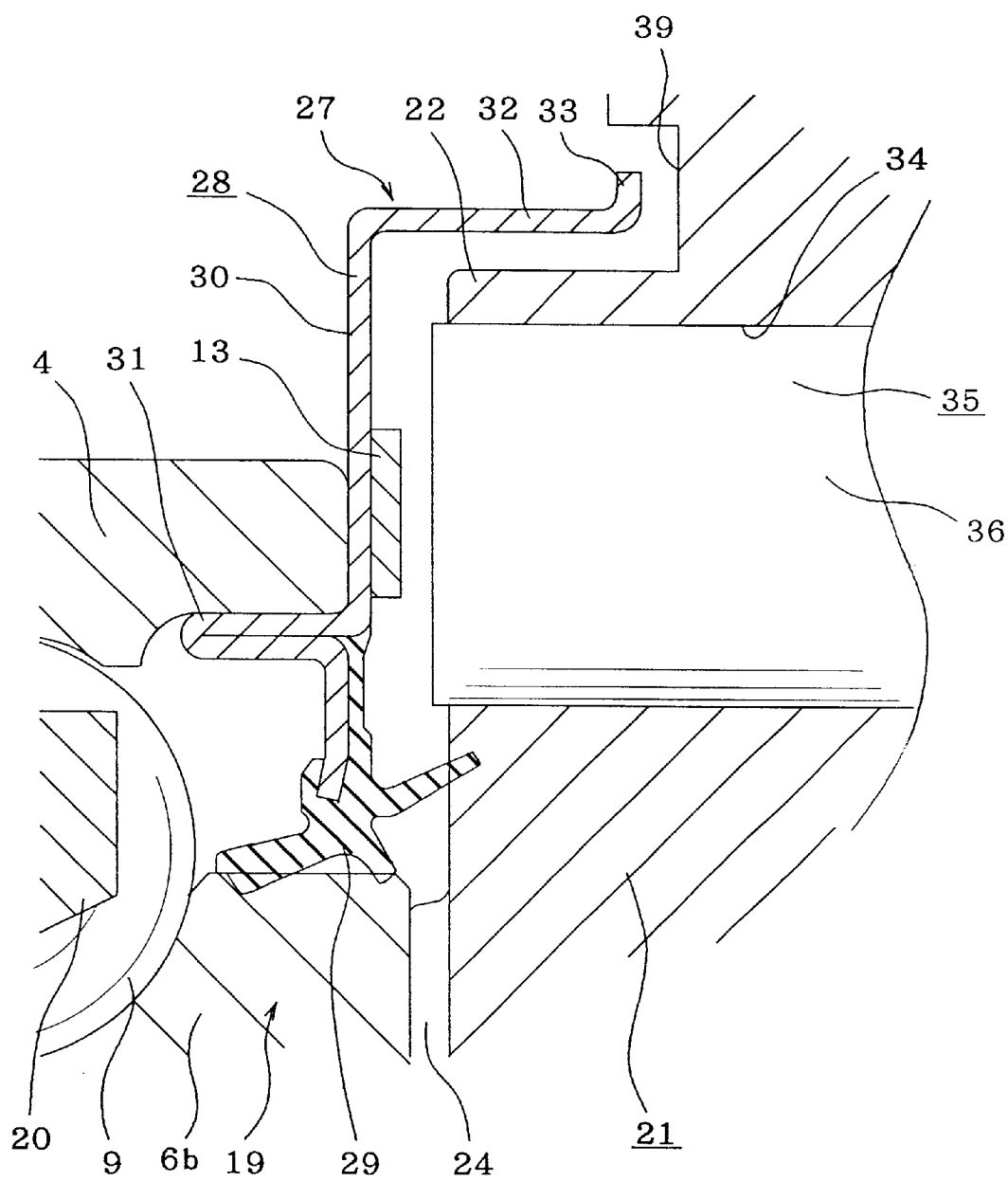
FIG. 5 is an enlarged view of Portion V in FIG. 4.

Next, FIGS. 4 and 5 show another embodiment of the invention. In this embodiment, a groove 39 is formed all the way around the circular raised section 22 on the axially outer side surface (right side surface of FIGS. 4 and 5) of the connection section 21. Also, the brim portion 33 on the end edge of the cylindrical section 32 of the metal ring 28 of the seal ring 27 loosely fits inside the groove 39 to form a labyrinth seal between this brim portion 33 and the groove 39. In the case of this embodiment, the ability to prevent foreign matter from getting into the section of permanent magnet 13 of the encoder is improved by using this kind of labyrinth seal when compared with the first embodiment described above. The other construction and function is the same as that of the embodiment in FIG. 3, and therefore any redundant explanations are omitted with the like numbers used for the like parts in the figure.

Figure 6:
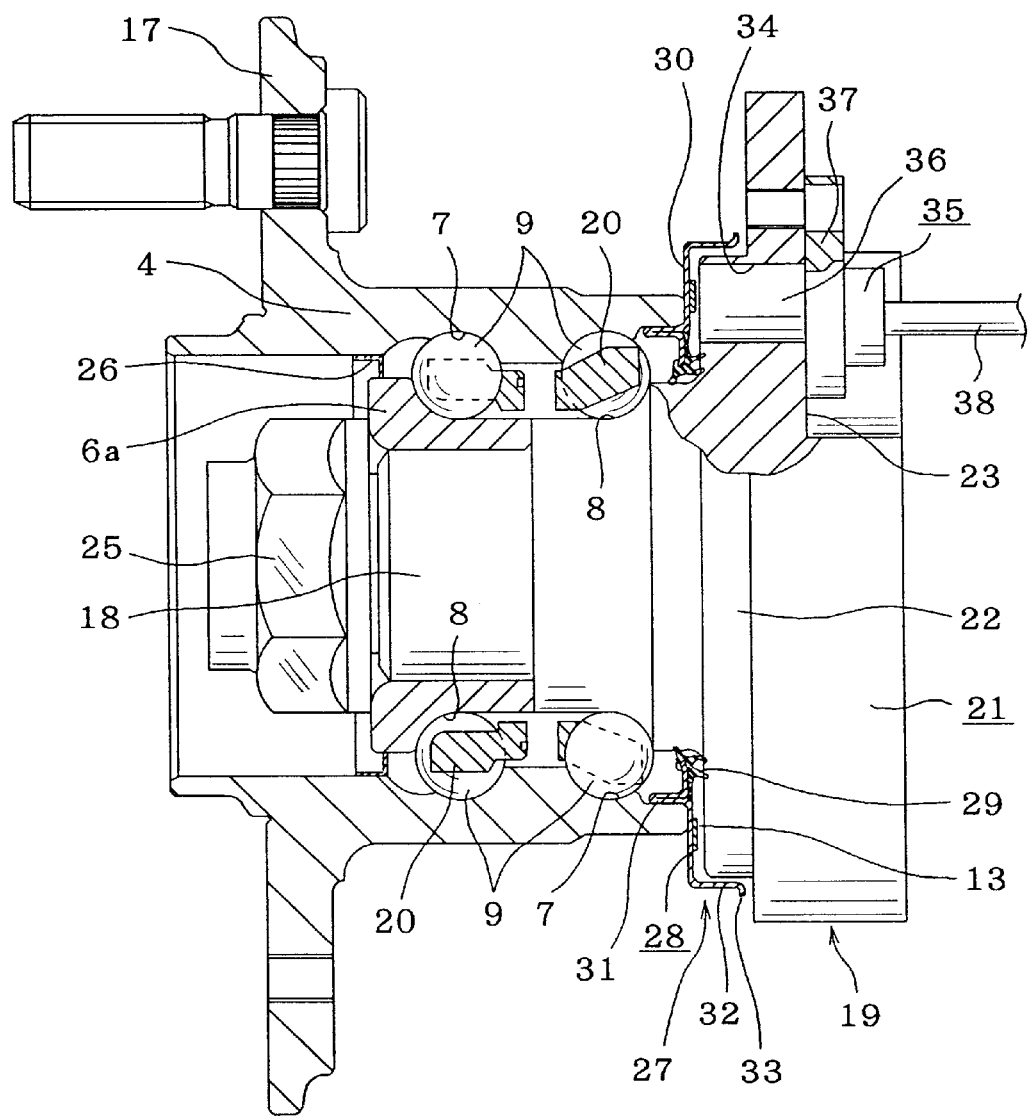
FIG. 6 is a cross sectional view of the rolling bearing unit with encoder according to another embodiment of the present invention.

Next, FIG. 6 shows another embodiment of the invention. In this embodiment, one of the inner-ring raceways 8 (right raceway in FIG. 6) is formed directly around the outer peripheral surface in the center of the spindle 18 that makes up the stationary race together with the inner ring 6a. In this way, only one inner ring 6a fits around the spindle 18. The other constriction and function is the same as that of the embodiment in FIG. 2, and therefore any redundant explanations are omitted with the like numbers used for the like parts in the figure.

Figure 7:
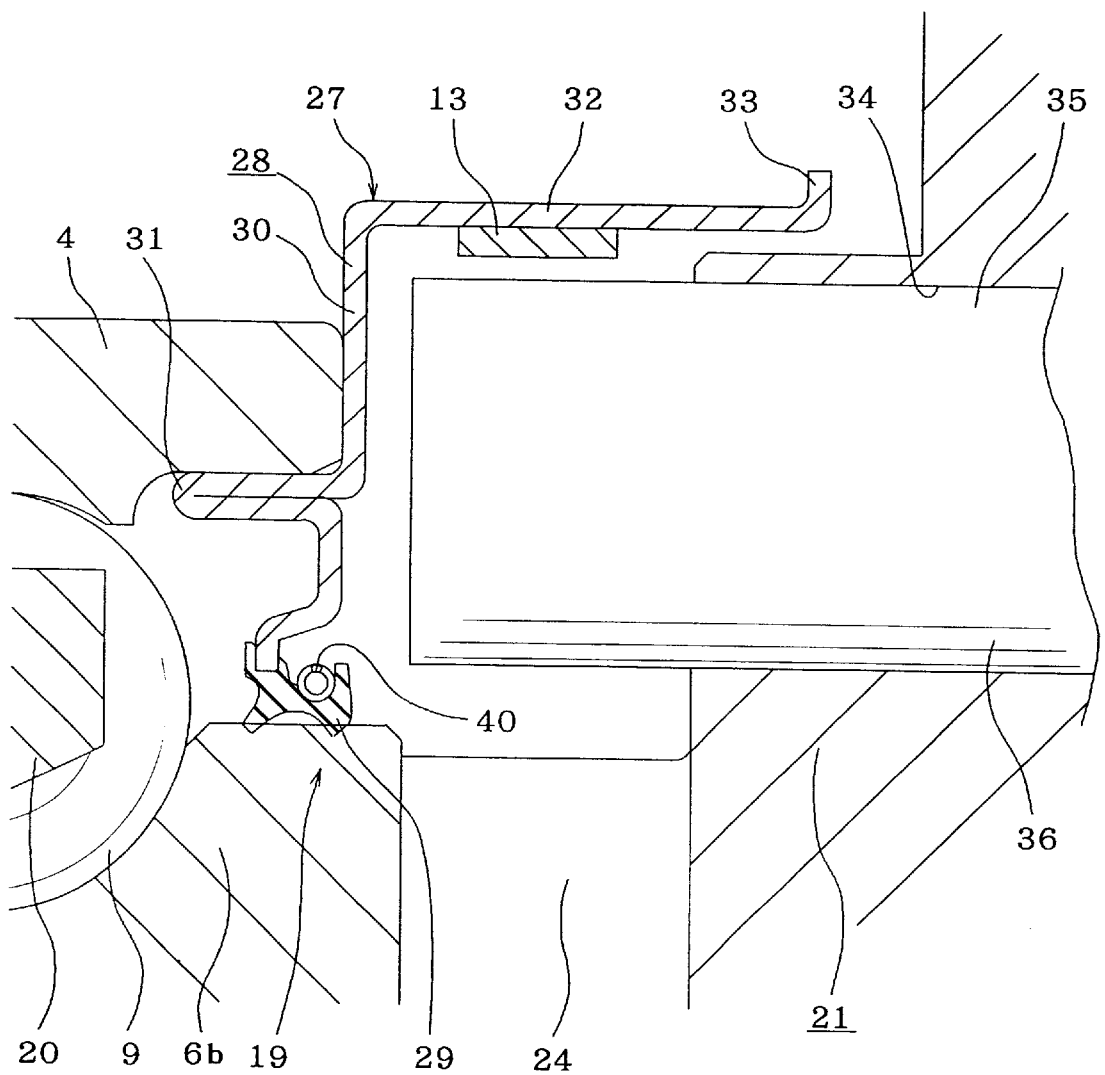
FIG. 7 is an enlarged view similar to FIG. 3 to show another embodiment of the present invention.

Next, FIG. 7 shows another embodiment of the invention. In this embodiment, the permanent magnet 13 is made in a cylindrical shape to function as the encoder and attached all the way around the inner peripheral surface of the cylindrical section 32 of the metal ring 28 of the seal ring 27. This permanent magnet 13 is magnetically oriented around the radial direction such that the direction of magnetic orientation alternately changes with equal intervals around in the circumferential direction. Accordingly, the S poles and N poles are arranged alternately with equal intervals around the inner peripheral surface of the permanent magnet 13.

The detector section that is located around the outer peripheral surface on the tip end of the insertion section 36 of the sensor unit 35 faces the inner peripheral surface of this permanent magnet 13 through a radial small gap.

Moreover, the inside peripheral edge of the seal lips 29, that are located all the way around in the inner edge of the metal ring 28, comes in sliding contact with the outer peripheral surface on the axially inner end of the inner ring 6b that makes up the stationary race. These seal lips 29 have a garter belt 40 attached thereto to maintain the seal performance in the sliding contact area between the inner peripheral edge of the seal lips 29 and the outer peripheral surface on the axially inner end of the inner ring 6b. The other construction and function is the same as that of the embodiment in FIG. 2, and therefore any redundant explanations are omitted with the like numbers used for the like parts in the figure.

Figure 8:
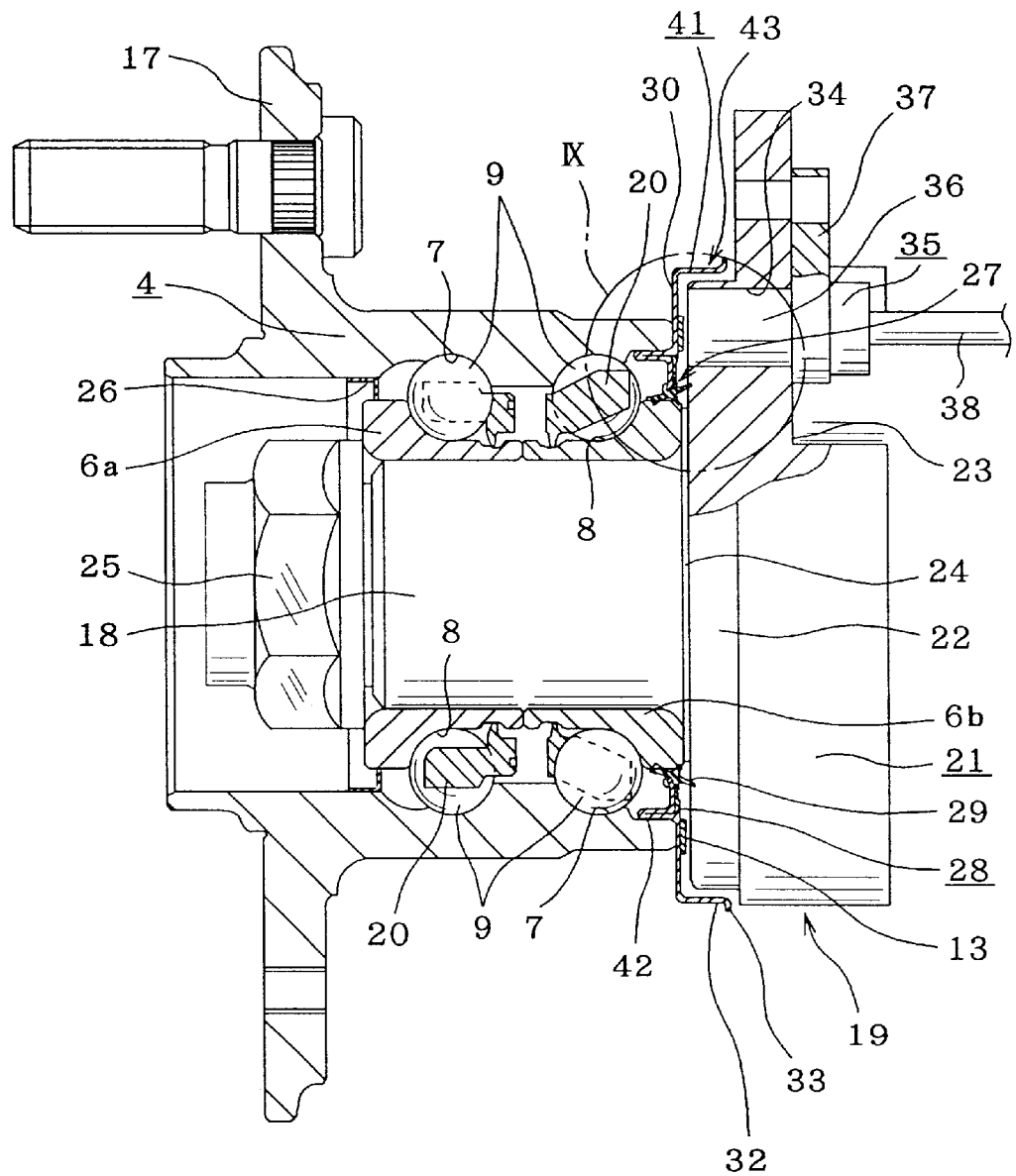
FIG. 8 is a cross sectional view of the rolling bearing unit with encoder according to another embodiment of the present invention.
Figure 9:
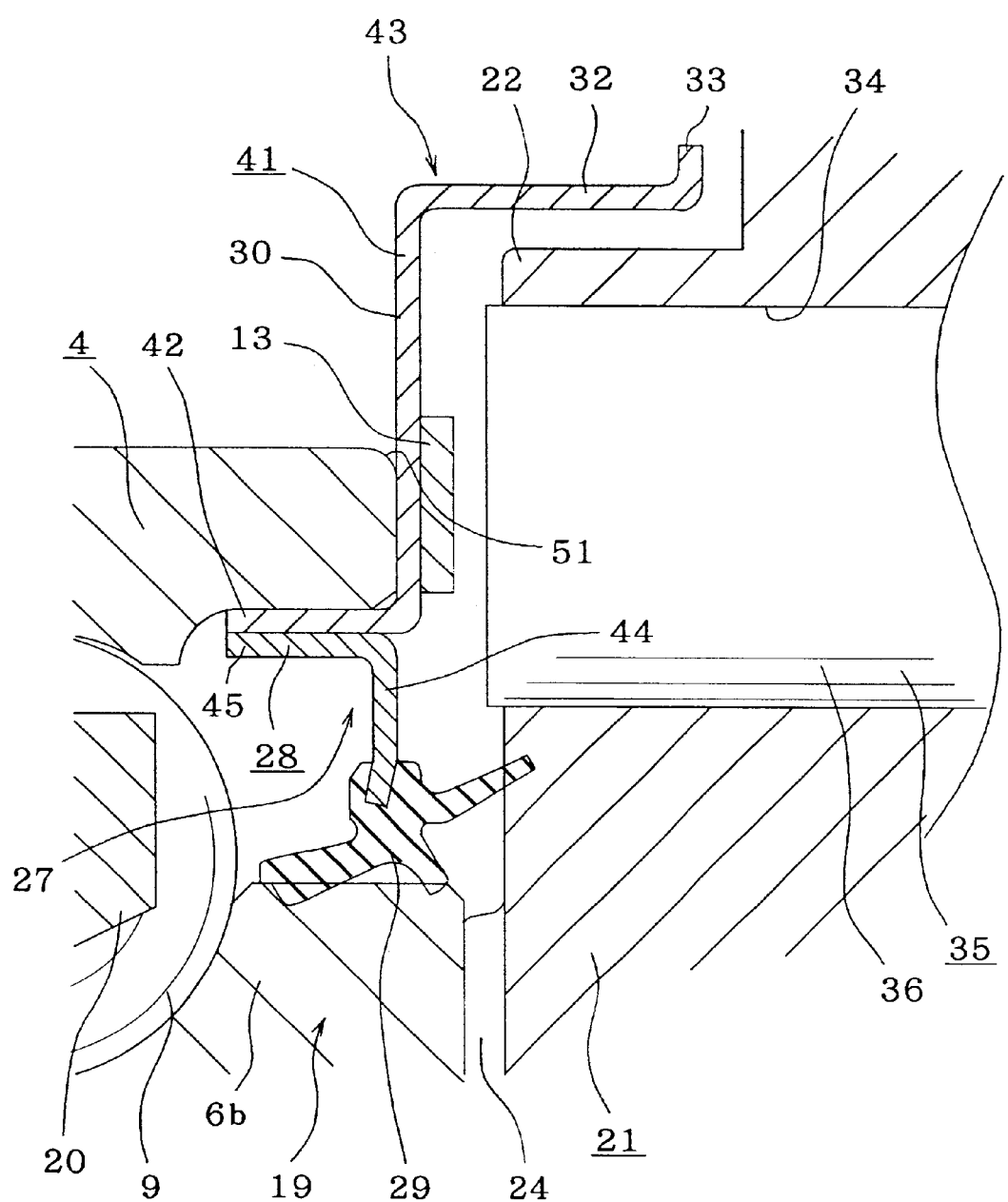
FIG. 9 is an enlarged view of Portion IX in FIG. 8.

Next, FIGS. 8 and 9 show another embodiment of this invention. In this embodiment, different from the previously described embodiments, a second metal ring 41 separate from the metal ring 28 of the seal ring 27 is provided, and the permanent magnet 13 that functions as the encoder is formed on part of this second metal ring 41. In other words, this second metal ring 41, similar to the metal ring 28 (FIGS. 3, 5, 7) of the previously described embodiments, is formed by bending processing of an anti-corrosive, magnetic metal plate, such as stainless steel plate, galvanized steel plate or chrome-plated steel, so that it is entirely circular. This second metal ring 41 comprises a circular section 30, a second cylindrical fitting section 42 that is formed by bending the inner peripheral edge of the circular section 30 at a right angle toward the rotating race or hub 4, and a cylindrical section 32 that is formed by bending the outer peripheral edge of the circular section 30 at a right angle toward the connection section 21 on part of the stationary race. Of these, the second cylindrical fitting section 42 corresponds to the cylindrical fitting section 31 (FIGS. 3, 5, 7). Also, the cylindrical section 32 serves the same purpose of the cylindrical section 32 (FIGS. 3, 5, 7) that was formed on the metal ring 28. Moreover, the tip end edge of the cylindrical section 32 is bent at a right angle outward in the radial direction to form an outward flange-shaped brim portion 33. Also, by attaching the permanent magnet 13 all the way around on the inner diameter portion of the circular section 30 such that it is concentric with the hub 4, it forms an encoder ring 43. By fitting the second cylindrical fitting section 42 in the axially inner end of the hub 4 by way of interference fit, the encoder ring 43 is fixed to the hub 4.

As the second metal ring 41 that supports this kind of permanent magnet 13 is formed separate from the metal ring 28 of the seal ring 27, the metal ring 28 is formed as described below. That is, this metal ring 28 is shaped with an L-shaped cross selection and such that it is entirely circular, and it comprises a circular section 44 and a third cylindrical fitting section 45 that formed by bending the outer peripheral edge of this circular section 44 at a right angle toward the opposite of the connection section 21. Also, by fitting this third cylindrical fitting section 45 into the radially inside of the second cylindrical fitting section 42 that is fitted into the axially inner end of the hub 4, this metal ring 28 is supported on the axially inner end of the hub 4 by way of the second metal ring 41. Moreover, seal lips 29 made of an elastic material is attached all the way around the inner peripheral edge of the circular section 44 of the metal ring 28 by glazing or adhesive.

In this embodiment, the metal ring 28 of the seal ring 27 does not necessarily need to be made of magnetic material and can be made of non-magnetic material. However, in order to increase the density of the magnetic flux coming from the permanent magnet 13 and to improve the accuracy of detection of the sensor, it is desirable that this metal ring 28 also be made of magnetic material like the second metal ring 41.

The other construction and function are the same as that of the embodiment in FIG. 2, so any redundant explanations are omitted with the like codes used for the like parts.

Figure 10:
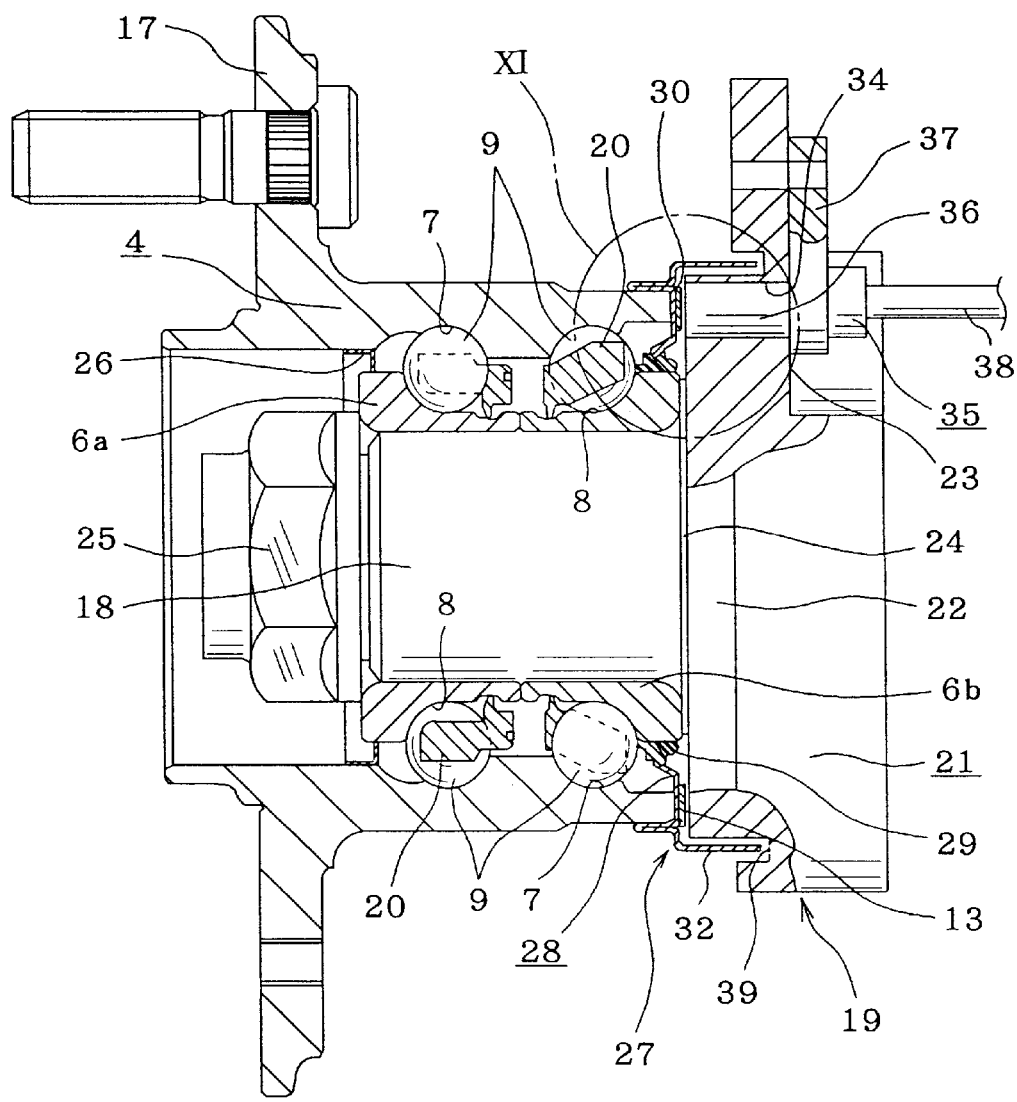
FIG. 10 is a cross sectional view of the rolling bearing unit with encoder according to another embodiment of the present invention.
Figure 11:
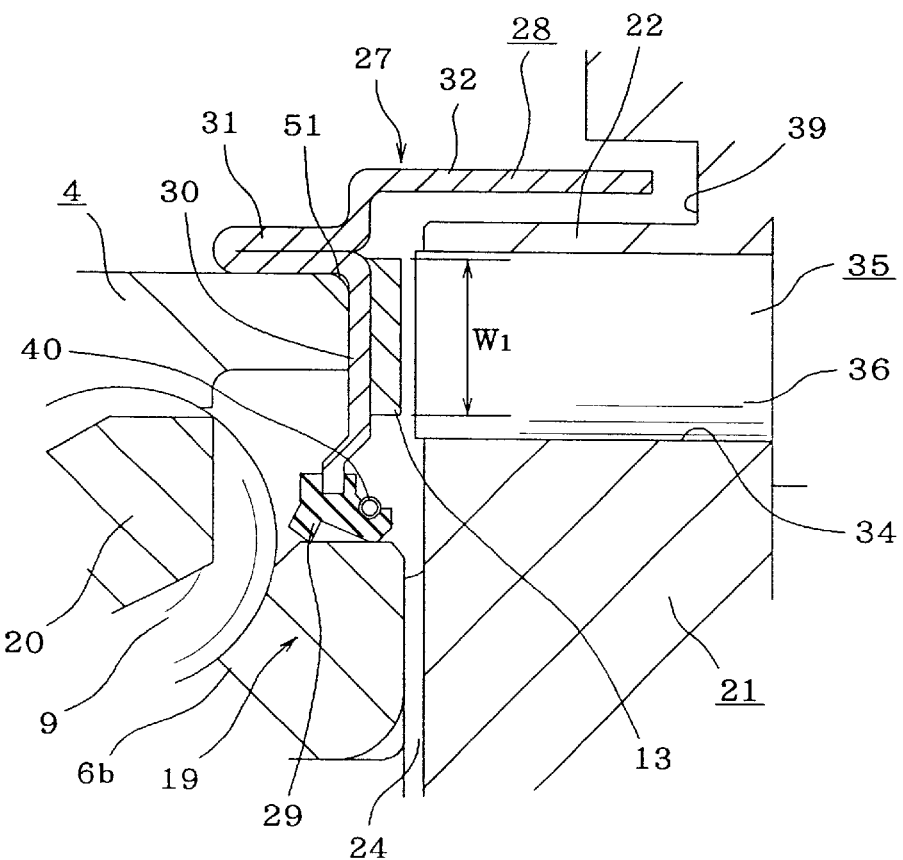
FIG. 11 is an enlarged view of Portion XI in FIG. 10.

Next, FIGS. 10 and 11 show another embodiment of this invention. This embodiment, similar to the embodiments in FIGS. 2 to 7 described above, supports a permanent magnet 13, that functions as the encoder, on the metal ring 28 of a seal ring 27. In the case of the embodiments of FIGS. 2 to 7, the cylindrical fitting section 31, which is formed in the center in the radial direction of the circular section 30 of the metal ring 28, fit inside the axially inner end of the hub 4, which functions as the stationary race. However, in this embodiment, the cylindrical fitting section 31 is formed in substantially the same shape, but it fits tightly onto the axially inner end of the hub 4. Therefore, this cylindrical fitting section 31 is formed by having the area further outward than the area that supports the permanent magnet 13 on the center of the circular section 30 of the metal ring 28 stick out, and by bending back the center of this portion that sticks out by 180 degrees. In other words, the diameter of this cylindrical fitting section 31 is larger than that described above for the embodiments in FIGS. 2 to 7. Also, a cylindrical section 32 is formed by bending the part that is further outward than the cylindrical fitting section 31 on the outer peripheral edge of the circular section 30 in the radial direction, toward the connection section 21 on part of the stationary race.

Moreover, similar to the embodiment described above and shown in FIG. 7, seal lips 29 are located all the way around the inner peripheral edge of the metal ring 28, and a garter belt 40 is attached to these seal lips 29 in order to maintain a seal in the area where the inner peripheral edge of the seal lips 29 comes in contact with the outer peripheral surface on the axially inner end of the inner race 6b.

With the rolling-bearing unit with encoder of this embodiment, since the seal ring 27 is constructed as described above, it is possible to increase the width $w_1$ in the radial direction of the permanent magnet 13 that is supported by the seal ring 27. In other words, by forming the cylindrical fitting section 31 on the radially outer part of the circular section 30, it is possible to increase the width of the section that is flat and continuous in the radial direction of the circular section 30. To correspond to this, since it is possible to increase the width $W_1$ in the radial direction of the permanent magnet 13 that is supported by the flat, continuous section, it is possible to increase the pole width of the respective poles (N or S) of this permanent magnet 13, and thus improve the detection performance of the sensor.

Figure 12:
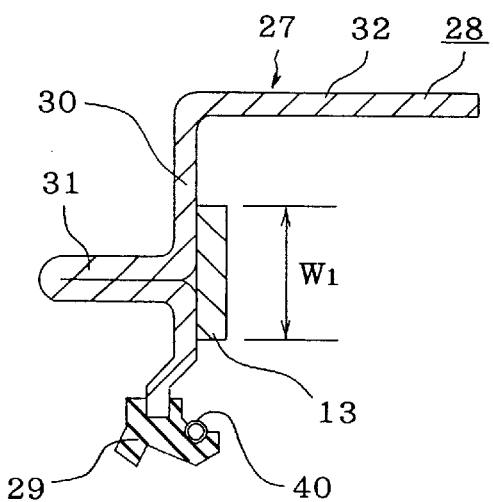
FIG. 12 is a partial cross sectional view to show an example of a cylindrical fitting portion provided in a radially inner portion of the metal ring for a seal ring.

On the other hand, by not increasing the diameter of the metal ring 28 and by forming the cylindrical fitting section 31 on the radially inside portion of the circular section 30 such that the cylindrical fitting section 31 fits inside the axially inner end of the hub 4, it is feasible that the width $W_1$ in the radial direction of the permanent magnet 13 could be increased, however from the aspect of maintaining the detection accuracy of the sensor, it is not desirable. In other words, as shown in FIG. 12, for a seal ring 27 that supports a permanent magnet 13 whose width $W_1$ in the radial direction has been increased, in the part of the metal ring 28 the cylindrical fitting section 31 of which is formed on the radially inner part of the circular section 30, not only the flat portion of the circular section 30 but also the part where the cylindrical fitting section 31 is formed face the axially outer side surface of the permanent magnet 13. In this area, the surface of contact between the permanent magnet 13 and the circular section 30 is not perpendicular with respect to the axial direction of both of these members 13, 30. The permanent magnet 13 that functions as the encoder together with the metal ring 28 made of magnetic metal plate, is generally magnetized after affixing it to the metal ring 28 by glazing, however, if a surface exists, such as described above, that is not perpendicular with respect to the axial direction, the flow direction of part of the magnetic flux that flows between the permanent magnet 13 after being magnetized and the detection section of the sensor is not perpendicular with respect to the surface of the detection section. From the aspect of improvement of the detection accuracy of the sensor, it is not desirable for the flow direction of the magnetic flux to not be perpendicular with respect to the surface of the detection section of the sensor in this way. Therefore, with the construction of this embodiment, since the permanent magnet 13 and the circular section 30 only come in direct contact to each other at a location where they are both flat, the aforementioned problem does not occur and it is possible to increase the pole width of the respective poles of the permanent magnet 13, and thus be able to improve the detection performance of the sensor.

The other construction and function are the same as that of the embodiment shown in FIGS. 4 and 5, so any redundant explanations are omitted with the like codes used for the like parts.

Figure 13:
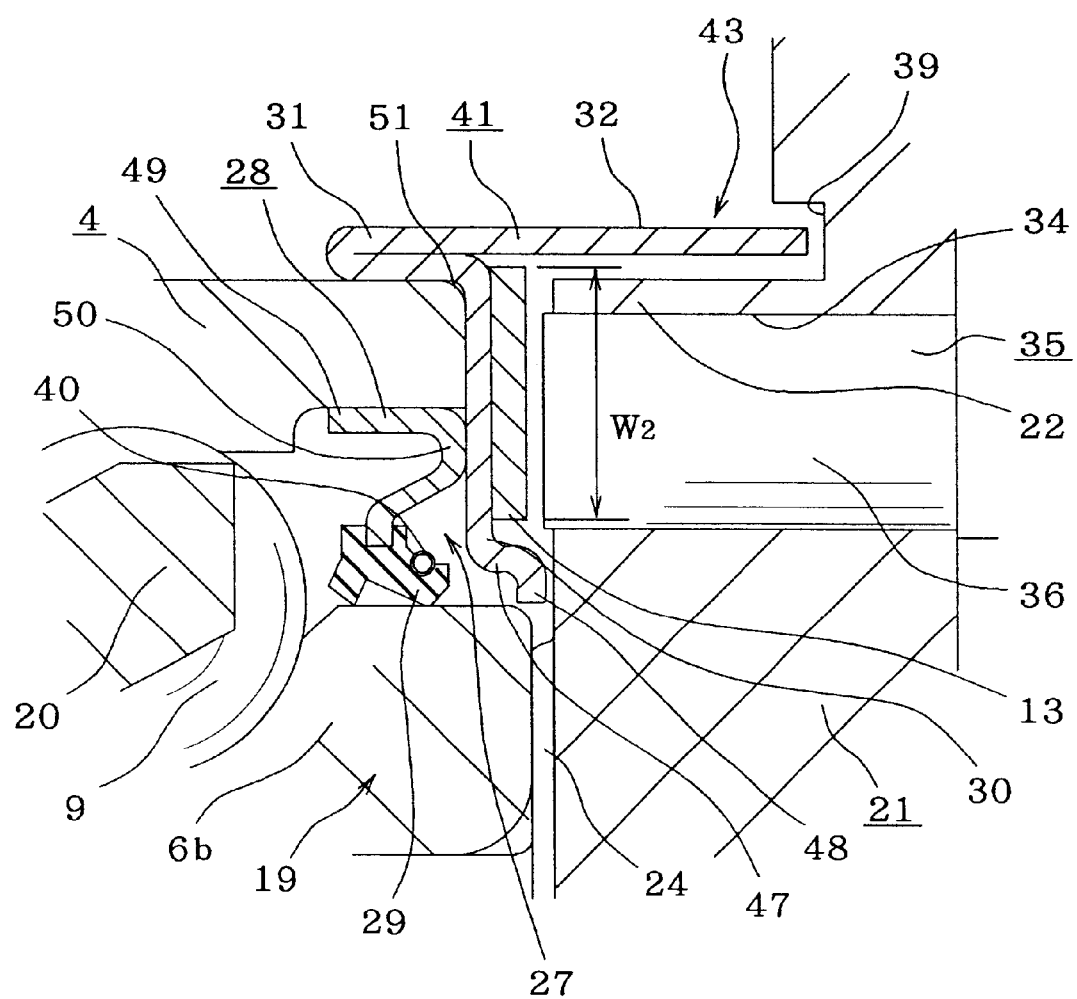
FIG. 13 is a view similar to FIG. 11 to show another embodiment of the present invention.

Next, FIG. 13 shows another embodiment of this invention, that similar to the embodiments of FIG. 10. In the case of this embodiment, a second metal ring 41 is formed that is separate from the metal ring 28 of the seal ring 27, and the permanent magnet 13 that functions as the encoder is located on part of this second metal ring 41.

In other words, the second metal ring 41, like that described above in the embodiments of FIG. 8, is made of anti-corrosive, magnetic metal plate such as stainless steel, galvanized steel plate or chrome-plated steel plate, and is formed using a bending process such that it is completely annular. This second metal ring 41 comprises a cylindrical fitting section 31, that is formed by bending the part on the outer peripheral edge of the circular section 30 that is further radially outward than the part that supports the permanent magnet 13, at right angles toward the hub 4 and then bending it back 180 degrees, and a cylindrical section 32 that is formed by the bent portion of the cylindrical fitting section 31 that sticks out further than the circular section 30 toward the connection section 21. This cylindrical section 32 serves the same purpose as the cylindrical sections 32 (see FIG. 11) that were formed on the metal ring 27 in the embodiments in FIGS. 10 to 12. Moreover, on the inner peripheral edge of the circular section 30 there is a first bent section 47 where this inner peripheral edge is bent at a right angle toward the connection section 21, and a second bent section 48 that is bent inward at a right angle from the first bent section 47. Also, an encoder ring 43 is formed by supporting the permanent magnet 13 on the axially inner side surface in the center in the radial direction of the circular section 30.

Tile encoder ring 43, constructed as described above, is attached to the axially inner end of the hub 4 by tightly fitting the cylindrical fitting section 31 around the axially inner end of the hub 4 by way of interference fit. Moreover, the axially inner side surface of the second bent section 48 is very close to and faces the axially outer side surface of the connection section 21, and the inner peripheral surface of the first bent section 47 and the end edge of the second bent section 48 come very close to and face the outer peripheral surfaces of the inner race 6b and the step section 24 to which the inner race 6b is abutted to form a labyrinth seal.

Together with constructing the encoder ring 43 as described above, the metal ring 28 of the seal ring 27 is constructed as described below. This metal ring 28 is formed such that it is entirely circular ring shaped having a J-shaped cross section, and it comprises a fourth cylindrical fitting section 49 and circular section 50. Also, the metal ring 28 is supported on the axially inner end of the hub 4 by tightly fitting this fourth fitting section 49 inside the axially inner end of the hub 4 by way of interference fit. Moreover, seal lips 29, made of elastic material, are attached generally to the inner peripheral edge of this metal ring 28 and a garter belt 40 is attached to these seal lips 29.

With the rolling-bearing unit with encoder of this embodiment, constricted as described above, since the second metal ring 41, which supports the permanent magnet 13, is formed separate from the metal ring 28 of the seal ring 27, it is possible to increase the width in the radial direction of the circular section 30 of the second metal ring 41. Therefore, it is possible to increase the pole width $W_2$ of the respective poles (N and S-poles) of the permanent magnet 13 supported by this circular section 30 even more than done in the embodiments in FIGS. 10 to 12, thus making it possible to further improve the detection performance of the sensor. Moreover, by forming the metal ring 28 of the seal ring 27 separate from the second metal ring 41 that supports the permanent magnet 13, as described above, it is possible to form the first and second bent sections 47, 48 that create a labyrinth seal on the inner peripheral edge of the second metal ring 41. Also, since this labyrinth seal, formed by the first and second bent sections 47, 48 and the inner race 6b and step section 24 for abutment, is arranged in series with the seal lips 29 formed on the inner peripheral edge of the seal ring 27, it is possible to improve the seal performance for the space where the balls 9 are located. In this embodiment, since labyrinth seals are formed in series at two locations, it is even possible to omit the seal ring 27.

By connecting the encoder ring 43 and seal ring 27, that are constructed as described above, together into one piece, specifically by attaching part of the axially outer side surface of the circular section 30 of the encoder ring 43 with the axially inner side surface of the circular section 50 of the seal ring 27, and securing them by spot welding etc., it is possible to improve service, such as inspection or repair, of this rolling-bearing unit with encoder.

The other construction and function are the same as that of the embodiments of FIGS. 10 to 12, so any redundant explanations are omitted with the like codes used for the like parts.

Figure 14:
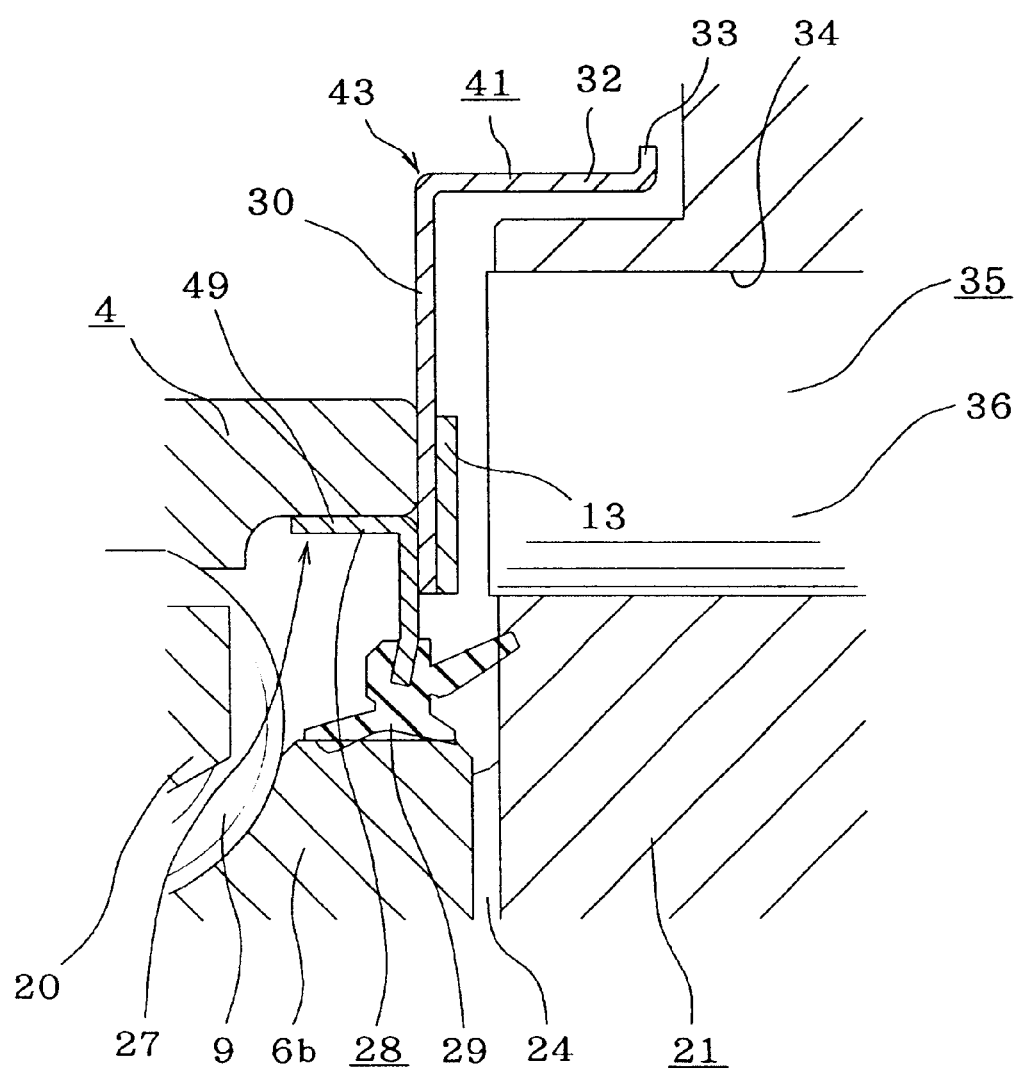
FIG. 14 is a view similar to FIG. 9 to show another embodiment of the present invention.

Next, FIG. 14 shows another embodiment of the invention, similar to the embodiment of FIG. 9. In the case of this embodiment, a permanent magnet 13 functions as the encoder formed on tile second metal ring 41. This permanent magnet 13, similar to the embodiments described above, is made of a magnetic material such as a rubber magnet, plastic magnet, or ferrite magnet, that is magnetically oriented in the axial direction. Also, the direction of the orientation alternately changes at equal intervals around in the circumferential direction. This kind of permanent magnet 13 is attached to the radially inner part on the axially inner surface of the second metal ring 41 by its own magnetic attractive force or by adhesive or glazing.

The other construction and function are the same as that of the embodiment of FIG. 9, so any redundant explanations are omitted with the like codes used for the like parts in the figure.

The rolling bearing unit with encoder of the present invention constructed and operated as mentioned above can effectively prevent foreign matter from adhering to the encoder to keep the detection precision of the rotation speed of the rotating race and the reliability of the detected values for a long time of period in use. Incidentally, the permanent magnet is not necessarily arranged in a complete annular shape.

What is claimed is:

1. A rolling bearing unit comprising:
    a rotating ring having an inner peripheral surface on which an outer ring raceway is formed, an outer peripheral surface on which a rotating flange is formed, and an end having an outer diameter,
    a stationary ring having an outer peripheral surface on which an inner ring raceway is formed,
    a plurality of rolling members rotatably provided between the outer ring raceway and the inner ring raceway,
    an annular multi-pole magnet encoder having circumferential characteristics alternately changing with an uniform interval, supported in a concentric relation with the rotating ring, and an outer diameter larger than the outer diameter of the end of the rotating ring, and
    a cover supported by the rotating ring and provided with a cylindrical portion radially outside the encoder to cover the encoder in the radial direction.

2. A rolling bearing unit comprising:
    a rotating ring having an inner peripheral surface on which an outer ring raceway is formed, an outer peripheral surface on which a rotating flange is formed, and an end having an outer diameter,
    a stationary ring having an outer peripheral surface on which an inner ring raceway is formed,
    a plurality of rolling members rotatably provided between the outer ring raceway and the inner ring raceway,
    a seal ring comprising a reinforcing metal plate and a seal lip,
    the reinforcing metal plate fitted to the end of the rotating ring,
    the seal lip made of a resilient material and having an end edge,
    an annular multi-pole magnet encoder having circumferential characteristics alternately changing with a uniform interval, supported in a concentric relation with the rotating ring, and an outer diameter larger than the outer diameter of the end of the rotating ring,
    the end edge of the seal lip being brought in sliding contact with part of the outer peripheral surface of the stationary ring,
    the reinforcing metal plate having a cylindrical portion provided radially outside the encoder, and
    the cylindrical portion bent to the side far from the rolling members.

3. A rolling bearing unit comprising:
    a rotating ring having an inner peripheral surface on which an outer ring raceway is formed, an outer peripheral surface on which a rotating flange is formed, and an end having an outer diameter, a stationary ring having an outer peripheral surface on which an inner ring raceway is formed, a plurality of rolling members rotatably provided between the outer ring raceway and the inner ring raceway, a seal ring comprising a first reinforcing metal plate and a seal lip, the first reinforcing metal plate supported by and in the end of the rotating ring, the seal lip made of a resilient material and having an end edge, an annular multi-pole magnet encoder having circumferential characteristics alternately changing with a uniform interval, supported in a concentric relation with the rotating ring, and an outer diameter larger than the outer diameter of the end of the rotating ring, a second reinforcing metal plate supported by the end of the rotating ring, and having a cylindrical portion and a cylindrical fitting portion, the cylindrical portion provided radially outside the encoder and bent to the side far from the rolling members, the cylindrical fitting portion provided radially inside the encoder, and bent to the side of the rolling members, fitted into the end of the rotating ring for supporting, and fitted onto the first reinforcing metal plate for supporting, and the end edge of the seal lip being brought in sliding contact with part of the outer peripheral surface of the stationary ring.

4. A rolling bearing unit comprising:

a rotating ring having an inner peripheral surface on which an outer ring raceway is formed, an outer peripheral surface on which a rotating flange is formed, and an end having an outer diameter, a stationary ring having an outer peripheral surface on which an inner ring raceway is formed, a plurality of rolling members rotatably provided between the outer ring raceway and the inner ring raceway, an annular multi-pole magnet encoder having circumferential characteristics alternately changing with a uniform interval, supported in a concentric relation with the rotating ring, and an outer diameter larger than the outer diameter of the end of the rotating ring, a reinforcing metal plate having a cylindrical fitting portion and a cylindrical portion, the cylindrical fitting portion provided radially outside the encoder and bent toward the rotating ring and fitted onto and supported by the rotating ring, and the cylindrical portion provided radially outside the encoder, and bent to the side far from the rolling members.

5. A rolling bearing unit comprising:

a rotating ring having an inner peripheral surface on which an outer ring raceway is formed, an outer peripheral surface on which a rotating flange is formed, and an end having an outer diameter, a stationary ring having an outer peripheral surface on which an inner ring raceway is formed, a plurality of rolling members rotatably provided between the outer ring raceway and the inner ring raceway, a seal ring comprising a first reinforcing metal plate and a seal lip, the first reinforcing metal plate having an outer peripheral surface formed with a cylindrical fitting portion, the cylindrical fitting portion fitted into the end of the rotating ring for supporting, the seal lip made of a resilient material and having an end edge, the end edge of the seal lip being brought in sliding contact with part of the outer peripheral surface of the stationary ring, an annular multi-pole magnet encoder having circumferential characteristics alternately changing with a uniform interval, supported in a concentric relation with the rotating ring, and an outer diameter larger than the outer diameter of the end fo the rotating ring, a second reinforcing metal plate having a cylindrical portion and a cylindrical fitting portion, the cylindrical portion provided radially outside the encoder, and the cylindrical fitting portion fitted onto and supported by the end of the rotating ring.

* * * * *